US010389166B1

(12) United States Patent
Sahoo et al.

(10) Patent No.: US 10,389,166 B1
(45) Date of Patent: Aug. 20, 2019

(54) METHOD AND SYSTEM FOR SINGLE STAGE BATTERY CHARGING

(71) Applicant: Apple Inc., Cupertino, CA (US)

(72) Inventors: Ashish K. Sahoo, Cupertino, CA (US); Poornima Mazumdar, Austin, TX (US); Nancy Y. Sun, San Francisco, CA (US); Zaka Ullah Zahid, Sunnyvale, CA (US); Dong Young Lee, Cupertino, CA (US)

( * ) Notice: Subject to any disclaimer, the term of this patent is extended or adjusted under 35 U.S.C. 154(b) by 137 days.

(21) Appl. No.: 15/712,795

(22) Filed: Sep. 22, 2017

Related U.S. Application Data

(60) Provisional application No. 62/398,670, filed on Sep. 23, 2016.

(51) Int. Cl.
*H02J 7/04* (2006.01)
*H02J 7/00* (2006.01)

(52) U.S. Cl.
CPC ............ *H02J 7/045* (2013.01); *H02J 7/0065* (2013.01); *H02J 7/044* (2013.01)

(58) Field of Classification Search
CPC .. H02J 7/042; H02J 7/044; H02J 7/045; H02J 7/0063; H02J 7/0065; G01R 21/001; G01R 21/002; G01R 21/003; G01R 21/005; G01R 21/06; G01R 21/127; G01R 21/1271; G01R 21/1273; G01R 21/1275; G01R 21/1276; G01R 21/133; G01R 21/1331; G01R 25/00; G01R 25/04; G01R 25/005; G01R 29/24
See application file for complete search history.

(56) References Cited

U.S. PATENT DOCUMENTS

| | | | | |
|---|---|---|---|---|
| 6,160,374 | A * | 12/2000 | Hayes | H02J 7/025 320/108 |
| 8,179,100 | B2 * | 5/2012 | Vogel | H02J 7/0081 320/128 |
| 2015/0256024 | A1 * | 9/2015 | Higashi | H02J 7/042 320/155 |

(Continued)

OTHER PUBLICATIONS

Weise et al., "A Single-Stage Dual-Active-Bridge-Based Soft Switched Ac-Dc Converter With Open-Loop Power Factor Correction and Other Advanced Features," *IEEE Transaction on Power Electronics*, vol. 29, No. 8, Aug. 2014, pp. 4007-4016.

*Primary Examiner* — Nathaniel R Pelton
*Assistant Examiner* — Michael N Dibenedetto
(74) *Attorney, Agent, or Firm* — Polsinelli PC

(57) ABSTRACT

Aspects of the present disclosure involve a system and method for providing a boosted voltage using a single stage dual active bridge converter. In one embodiment, the single stage dual active bridge converter is introduced for high voltage charging using phase shift and frequency control. Phase shift and frequency control can be implemented on duty cycled switches and pulse width modulated switches in order to achieve a desired output voltage. In another embodiment, the phase shift and frequency controlled single stage dual active bridge converter is replicated in modular form to provide a single-phase system that provides a voltage for charging a high voltage system. In yet another embodiment, the phase shift and frequency controlled single stage dual active bridge converter is replicated in modular form to provide a three-phase system that provides a voltage for charging a high voltage system.

20 Claims, 9 Drawing Sheets

(56) References Cited

U.S. PATENT DOCUMENTS

2016/0105056 A1* 4/2016 Namurdri ............... H02J 7/02
  320/108
2016/0146895 A1* 5/2016 Yazami ............... B60L 58/34
  324/426

* cited by examiner

US 10,389,166 B1

METHOD AND SYSTEM FOR SINGLE STAGE BATTERY CHARGING

CROSS REFERENCE TO RELATED APPLICATIONS

This application is related to and claims priority under 35 U.S.C. § 119(e) from U.S. Patent Application No. 62/398,670 filed Sep. 23, 2016, titled "METHOD AND SYSTEM FOR SINGLE STAGE BATTERY CHARGING," the entire contents of which is incorporated herein by reference for all purposes.

TECHNICAL FIELD

This disclosure relates generally to a power correction factor system architecture used to supply an increased output voltage from a battery to a high load.

BACKGROUND

High powered systems generally utilize a high voltage battery charging system. Such high voltage battery charging systems often come in the form of a multi-stage system with an AC-to-DC power factor correction stage and a DC-to-DC stage. Multi-stage systems, however, are often voluminous, inefficient, or have low power densities. A single stage, high voltage battery charging system would therefore reduce many of the drawbacks to multi-stage high voltage battery charging systems.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Aspects of the present disclosure involve systems, methods, devices, and the like for supplying power to a battery for charging. In one embodiment, a single stage charger is introduced for high voltage charging that utilizes phase shift and frequency control. In one particular embodiment, the single stage charger may include a dual active bridge (DAB) converter with a primary and secondary side designed to perform power factor correction (PFC), AC-to-DC conversion, and DC-to-DC conversion. The primary side and secondary side of the DAB converter can each include an H-bridge circuit with switches that can operate using distinct modulation schemes. In particular, phase and frequency control can be implemented through the operation of the switches of the single stage charger to provide a desired output voltage while maintaining efficiency and high power density during charging of the battery. Both phase and frequency modulation may be applied to control the single stage DAB circuit over the entire operating range of the battery. In one embodiment, a modulator selects either or both of the frequency control or phase shift control of the DAB circuit based upon a sensed output battery voltage.

In another embodiment, a phase modular single stage circuit provides high power to charge a battery that may be operational in a one-phase or three-phase topology. In one particular example, the phase modular circuit includes three independent single stage chargers that can be interconnected at the output, with each of the three single stage chargers independently controllable to provide a total summed high output power. In addition, each single stage charger may also be independently phase and/or frequency controlled to achieve a desired output to charge a battery.

Conventionally, providing a high voltage range for charging of a battery has been accomplished by using a multi-stage charger generally including two (or more) independent stages that are joined by a DC bulk storage capacitor for energy storage and harmonic cancellation. In the multi-stage charger configuration, a first stage generally performs the AC-to-DC power correction stage (with the DC bulk storage capacitor) with an isolated second stage for DC-to-DC conversion. However, such a two stage topology can be inefficient or have low power density, especially at high voltage ranges.

Figure 1:
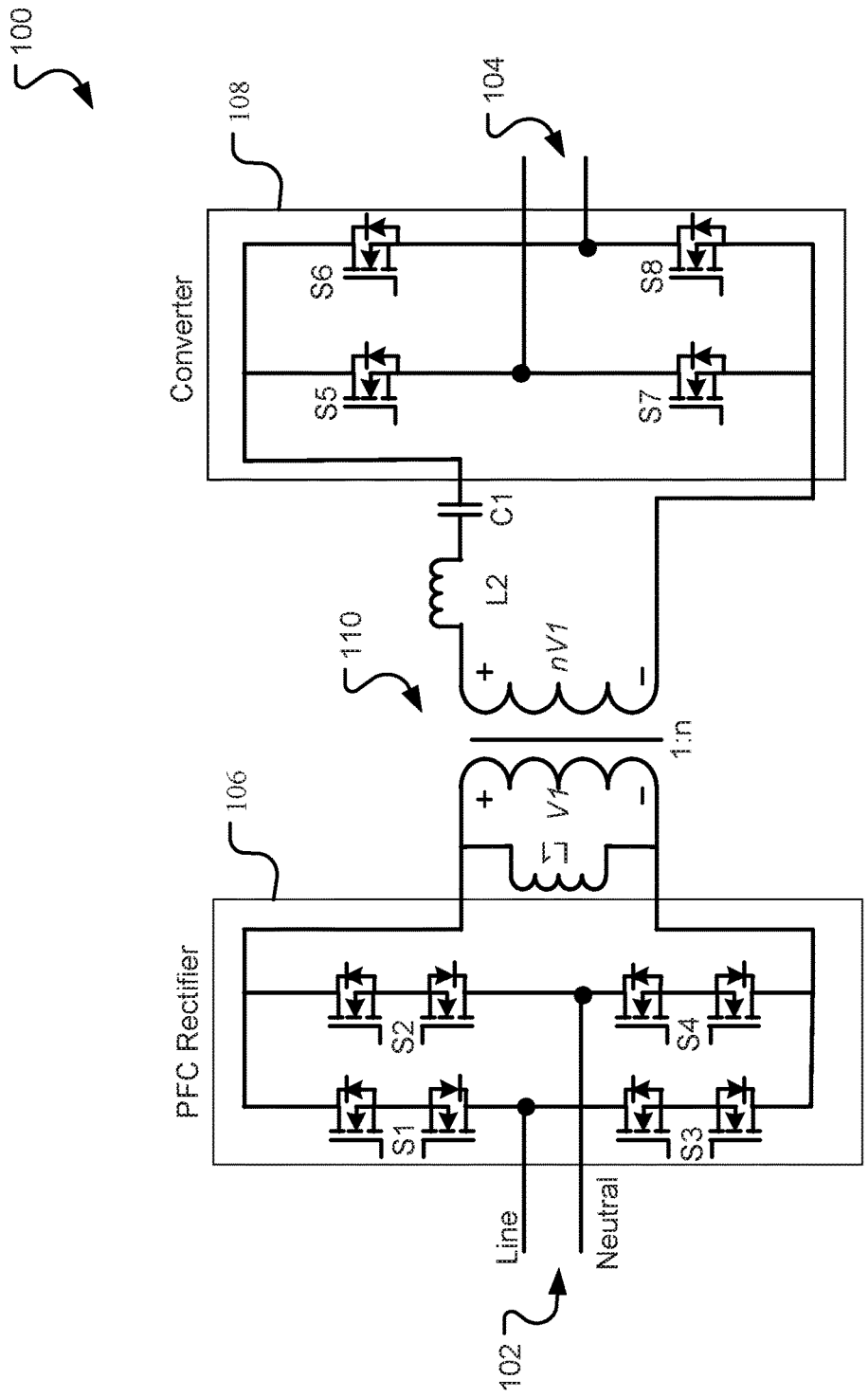
FIG. 1 is a diagram illustrating a single-stage, dual-active bridge converter.

In contrast, FIG. 1 illustrates an example embodiment of a single-stage, dual active bridge AC-DC converter 100 (hereinafter "DAB converter 100") for supplying output DC power signal (e.g., output 104) relative to an input AC input (e.g., AC source at input 102) to charge a battery. More particularly, FIG. 1 is a diagram illustrating a single-stage charger with a primary side "H-bridge" power factor correction (PFC) rectifier 106 and a secondary side H-bridge converter 108. A transformer 110 couples the primary side 106 and the secondary side 108 with a 1:n winding ratio. In general, DAB cconverter 100 is a singular stage system where the secondary side 108 switches S5-S8 operate as a function of the primary side 106 switches S1-S4. Thus, the S5-S8 switches can be controlled at least based in part on the functionality of the S1-S4 switches. For example, the S1-S4 switches on the H-bridge of the primary side 106 can be designed to operate on a particular duty cycle while the S5-S8 switches on the H-bridge of the secondary side 108 can be designed to depend on the voltage of the S1-S4 switches. In one embodiment, the S1-S4 switches operate on a 50% duty cycle and the S5-S8 switches are voltage controlled using Pulse-Width Modulation (PWM), as described in more detail below.

As indicated above, in the primary side 106 of the DAB converter 100, the switches S1-S4 can operate at 50% duty cycle. In particular, switches S1,S4 and switches S2,S3 operate in complementary fashion at duty ratio of 50% of switching frequency during both cycles of AC voltage. For example, during a positive cycle of AC voltage (VAC>0), switches S1,S4 turn ON, hence transformer primary voltage V1 equals VAC for Ts/2 time interval. Next switches S2,S3 turn ON (with switches S1,S4 turned OFF) and transformer primary voltage V1 equals −VAC for the next Ts/2 time interval. Here Ts has a switching period (of say 10 us). The transformer primary voltage V1 is a bipolar AC quasi-square waveform with an envelope of 60 Hz grid voltage on top but is chopped at 50% duty ratio to generate high frequency voltages (at say 100 kHz). V1 is then provided to the transformer 110 portion of the circuit 100. The transformer, having 1:n winding, operates to either up-convert or down-convert the voltage V1 provided at the input of the transformer 110 to higher voltage, namely nV1, depending on the battery operating voltage range requirement. Inductors L1, L2 and capacitor C1 of the transformer circuit 110 are magnetizing inductance of the transformer, leakage inductance of the transformer, and resonant capacitor to filter our switching noise, respectively, in the DAB converter 100 circuit.

The output of the transformer circuit 110 is provided as an input at the secondary side converter 108 of the DAB converter 100. In general, the secondary side converter 108 provides a pulse-width modulated signal as an output for voltage regulation. Pulse-Width Modulation (PWM) is a control scheme that can be used to control the power supplied to a load at an output 104. The output power provided from the secondary side converter 108 is generally controlled by utilizing switches S5-S8 to switch between supplying power to the load and removing power to the load at a determined rate to achieve a desired voltage level. For example, if the output voltage is used to charge a battery at 240V, then the switches S5-S8 can be controlled to turn off if the approximated voltage is greater than 240V and turn back on if the approximate voltage is less than 240V. In this manner, switches S5-S8 are switched on and off at a particular rate such that the output power at output 104 approximates a desired power level.

The control of the switches S1-S4 and S5-S8 in the DAB converter 100 may be controlled unlike the switch control used in conventional single-stage dual active bridge converters which generally operate at 50% duty cycle and provide constant power charging. Rather, in one embodiment, the voltage control provided through the PWM aspect of the converter 108 enables the duty ratio of the S5-S8 switches to be a function of the switching operation of the primary side 106 switches S1-S4. That is to say, the operation of the S1-S4 switches (and in particular the output voltage from the S1-S4 switches) controls the switching rate of the S5-S8 switches on the secondary side 108 of the DAB converter 100 circuit. Thus, an optimized switching control scheme (e.g., phase shift and/or frequency control) can be formulated for operation of DAB converter 100 to meet battery charging requirements and attain higher efficiencies over conventional topologies.

Although DAB converter 100 architecture is shown in FIG. 1 to include two conversion portions with switches, inductors, transformers, and capacitors, the circuit is not so limited. It should be appreciated that other system configurations may be possible as is the addition and/or reduction of other components. Further, the components including the inductors, capacitors, and switches may be replaced by other components with similar functionality. For example, switches S1-S8 may be replaced by relays, MOSFETS, IGBTs, SMPS, transistors, and the like.

Figure 2:
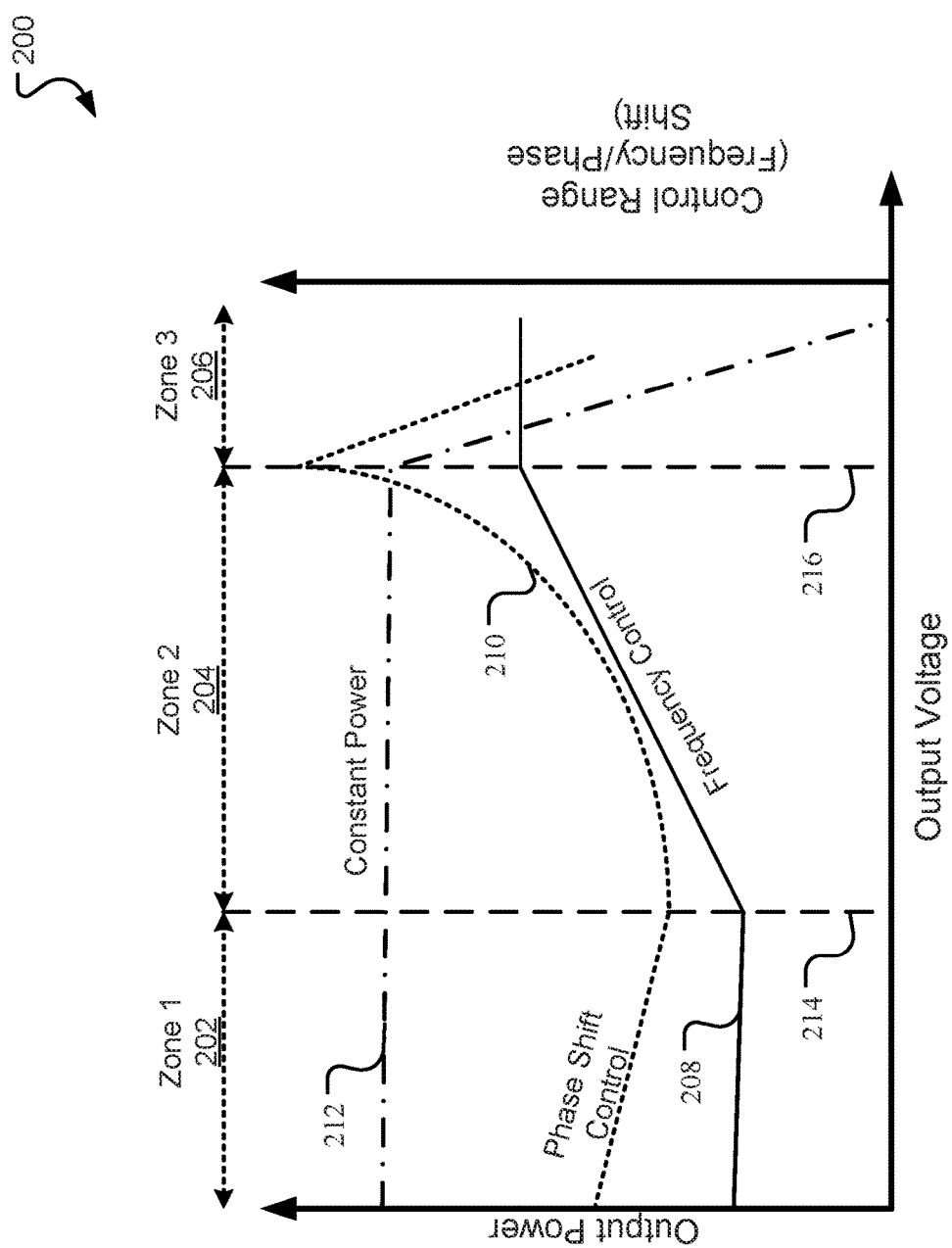
FIG. 2 is a graph illustrating a control scheme for frequency and phase shift control for a single-stage, dual active bridge converter.

As indicated above, an optimized switching scheme can be formulated for use by the DAB converter 100 to meet load power (e.g., battery) requirements. FIG. 2 is a graph illustrating a control scheme 200 that introduces frequency and phase shift controls for varying output voltage values of the battery that may be used in the operation of the single-stage dual active bridge converter 100 to charge the battery. As shown, the control scheme 200 may be divided into separate operational zones (e.g., Zone 1 202, Zone 2 204, and Zone 3 206). Zone 1 202 defines a control scheme applied to the charging of the battery when the output voltage from the battery is low. In this zone, a constant power level (illustrated in FIG. 2 as line 212) is provided to charge the battery, as defined in more detail below. Zone 2 204 defines a control scheme applied to the charging of the battery when the output voltage from the battery is nominal, or within a normal operating voltage range for the battery. Similar to Zone 1 202, a constant power level is provided to charge the battery during operation within Zone 2 204. Zone 3 206 defines a control scheme applied to the charging of the battery when the output voltage from the battery is high. The control scheme for Zone 3 206 provides a decreasing charging power to the battery through manipulation of a phase shift control and a frequency control of the DAB converter 100. The phase and frequency control scheme 200 illustrated in FIG. 2 allows for operation of the DAB converter 100 to recharge a battery over a large range of battery output voltage values, which may otherwise not be efficiently provided. In this manner, the phase shift and frequency control scheme 200 provides control of the DAB converter 100 to achieve improved performance over a large voltage range of battery operation.

In control scheme 200, each zone 202-206 is divided into output voltage ranges or specifically into load/battery operating ranges. For example, Zone 1 202 may be the voltage range that accounts for low operating voltages (output voltages) In this zone, the battery is charged with a constant power, as shown in control scheme 200. The DAB converter 100 operating in this zone provides the constant power charging signal to the battery through a constant frequency control 208 and adjusting the phase shift control 210 on the switches S1-S8. In general, phase shift control 210 is a control scheme of the DAB circuit 100 that controls the on time of one or more of the switches. Specifically, it provides the time delay that the switches S1-S8 encounter before turning on or activating relative to the corresponding switches on the other side of the circuit. In addition, frequency control is a control scheme that controls the width or period of the pulsating wave that is applied to the switches. For example, frequency control may provide the amount of time the secondary side switches S5-S8 of the DAB converter 100 remain on. In Zone 1 202 of FIG. 2, phase shift control 210 is applied while frequency control 208 is held constant. As such, in Zone 1 202 the switches S5-S8 can be turned on as indicated by the phase shift control, while the width (e.g., period) of the pulse provided to the switches S5-S8 is held constant at a minimum operating frequency. Further details, including a control circuit regarding the phase shift control and frequency control are described below and in conjunction with FIG. 3.

Turning back to FIG. 2, Zone 2 204 is defined for nominal battery output voltage values. To operate the DAB converter 100 within Zone 2 204, both frequency and phase shift control are used in order to provide the constant charging power 212 that may be needed at the battery. In particular, at nominal battery voltages, frequency control 208 and phase shift control 210 is introduced to leverage the additional power needed by the battery. As visible in graph 200, Zone 2 204 includes an area of DAB converter 100 operation where both frequency control 208 and phase shift control 210 are used. In general, output power of a DAB converter 100 can defined as:

$$\overline{P} = a * f(n, Vi, V\text{bat}) * \delta / (L * fs)$$

with $$\hat{d} = x + y * n * Vi / V\text{bat}$$

where, f(n,Vi,Vbat) is some function of n, Vi, and Vbat and x and y are some constants. Thus, output power $\overline{P}$ is directly proportional to phase shift ($\delta$) and inversely proportional to switching frequency. The purpose of the duty cycle control on secondary converter being a function of the grid voltage Vi is to shape the grid currents for power factor correction. Therefore, as illustrated in Zone 2 204, a change in frequency will inherently also provide some phase shift control 210.

At the highest voltage region, Zone 3 206, frequency control 208 is held constant and again phase shift control 210 is used. In some instances, a voltage limit may be set to establish a corresponding cut off frequency that is too high to use. Therefore, at Zone 3 206, a sharp decrease in power 212 is observed as frequency control 208 again is held constant and phase shift control 210 is used to deliver the required power to charge the battery.

Note that the control scheme 200 also includes boundaries separating each zone, which define the boundaries of operation 214, 216. That is to say, boundaries 214, 216 indicate the location where different control schemes for phase shift control 210 and/or frequency control 208 are used. Additionally, boundary 216 can indicate the threshold voltage which corresponds to a frequency value that cannot be exceeded (e.g., maximum operating frequency). Similarly, boundary 214 can identify the threshold voltage that defines the transition from low voltages into nominal voltages for the use of frequency control 208. It should be appreciated that the values assigned or associated with the boundaries 214, 216 may be any battery output voltage. For example, the particular voltage values that define a "low" value, a "nominal" value, or a "high" value may be any value and may, in some instances, be set as a particular percentage of the total output voltage capability of the battery being charged.

Figure 3:
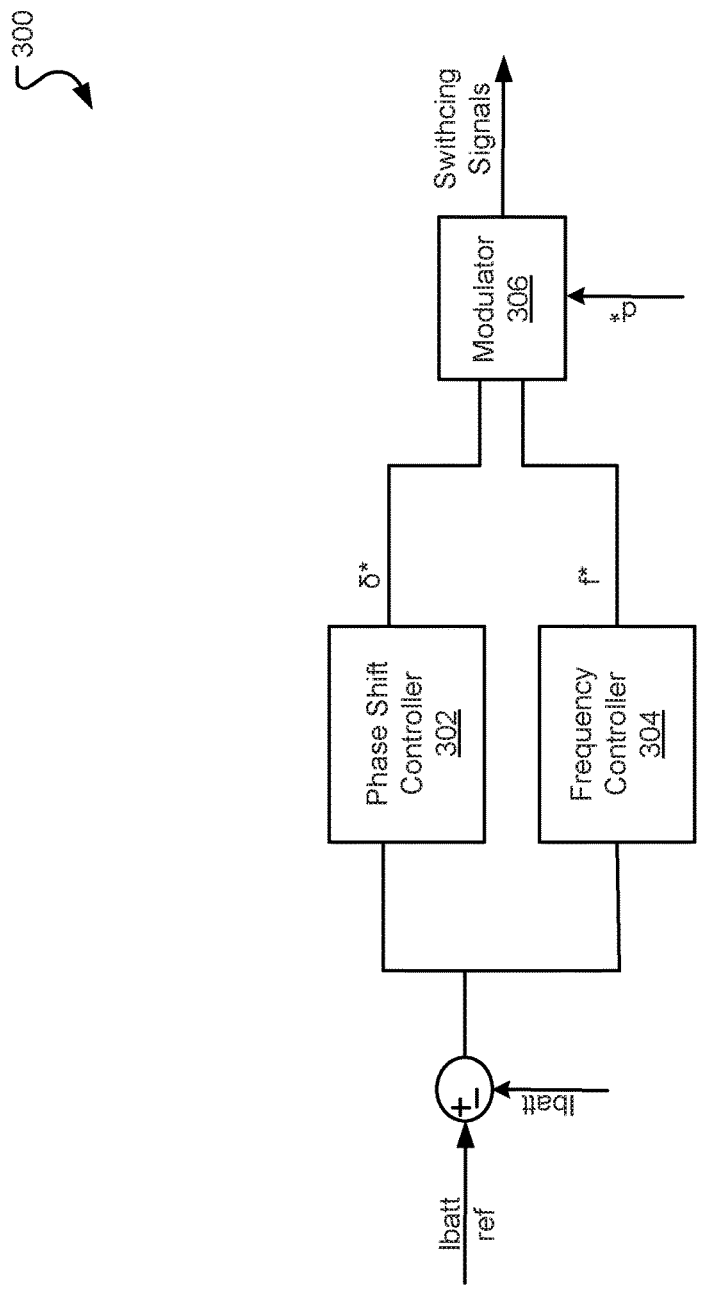
FIG. 3 is a diagram illustrating the frequency and phase shift control loops for a single-stage, dual active bridge converter.

FIG. 3 is a diagram illustrating a control block 300 used to control the phase shift and frequency of the DAB converter circuit 100. Specifically, FIG. 3 illustrates one embodiment of phase shift and frequency control loops 302,304 for a single-stage dual active bridge converter 100. As indicated, phase shift and frequency control may vary based on the battery voltage range of operation. As such, the phase shift loop 302 and/or the frequency loop 304 are activated based on the voltage range of operation as illustrated in the control scheme 200 of FIG. 2. In some instances, phase shift control may be applied, while the frequency control is held constant. In other instances, frequency control may be applied such that phase shift control also inherently applied. Examples of the phase shift and frequency control of the DAB circuit 100 through control of the phase shift loop 302 and/or the frequency loop 304 are shown in the control scheme 200 of FIG. 2.

The main inputs to the control loops are the output power reference of the DAB converter 100 (Ibatt) and the battery current reference (Ibatt_ref). These values can be determined or read by a processor or other module such that once determined, the zone 202-206 of operation and thus the control scheme for the control loops 302, 304 to use are defined. For example, if the battery has a low output voltage such that a constant power charge signal is provided, then operation of the DAB converter 100 is in Zone 1 202. As indicated in FIG. 2, Zone 1 202 utilizes a constant frequency control 208 and a varying phase shift control 210. In one instance, the phase shift control loop 302 and frequency control loop 304 are controlled based on the battery current reference Ibatt_ref. In other instances, the control loops may have a voltage mode control or power mode control.

As indicated, in current mode control, the use of phase shift and/or frequency control loops is based on the desired output voltage of operation Vbatt_ref and the zone the output voltage Vbatt_ref falls in, as defined by the zone boundaries 214,216 of the control scheme 200. In instances where phase shift control is used, battery current reference Ibatt_ref is input into the phase shift control loop 302. Alternatively, in instances where frequency control is used, the battery current reference Ibatt_ref is input into the frequency control loop 304. In either instance, the phase shift loop 302 and/or frequency loop 304 control the charging power provided to the battery by the DAB converter 100 circuit to recharge the battery during operation. In general, the frequency and phase-shift controllers 302, 304 can act either independently or together to generate the references for the modulator block 306. In some instances, the modulator block 306 also gets an input for duty ratio (d) reference based on the sensed input and output voltages and generates the switching signals for the two H-bridges of the DAB converter 100.

In general, the modulator 306 is a module that can communicate with the output pins in each of the switches. Therefore, the modulator 306 may control each switch individually and can thus use the delta identified to control the bridges on both sides of the transformer in the DAB controller 100. As shown in the graph 200 of FIG. 2, constant power is provided to the battery through control of the frequency loop 304 and the phase shift loop 302. In particular during Zone 1 202 operation, switching frequency is held constant at or near the minimum operating frequency while phase shift control is solely utilized to control the power transfer to the battery.

Similarly, when the output battery voltage falls within Zone 2 204 of FIG. 2 (or within a nominal output voltage), frequency control is applied to the DAB controller 100 through the frequency loop 304 in order to provide the desired recharge power to the battery. In particular, frequency control is applied based on a frequency offset identified by the frequency control loop 304. The frequency control loop works much like the phase shift control loop 302. In one particular embodiment, the frequency control loop 302 determines a reference current (Ibatt_ref) and compares it to the sensed current (Ibatt_sense) at the battery. The comparison provides an offset or voltage error frequency (Ve_freq) that is fed into the phase shift controller (PI-freq) to reduce the error and obtain the voltage offset (Vc_f) that needs to be compensated. The phase shift controller may be followed, in some instances, by a saturation loop which can include an anti-windup gain AWg for correcting the voltage offset (Vc_f) if it exceeds the modulation bounds. Once the offset has been corrected, the delta voltage (Vc_freq) is converted to a frequency value with the use of a carrier generator such as a voltage controlled oscillator (VCO). A VCO is an oscillator whose oscillating frequency is controlled by its input voltage. In other words, the instantaneous oscillating frequency (e.g., delta frequency value) is determined by an applied input voltage (e.g., delta voltage). The delta frequency value is then processed by modulator 306 which can control each of the switches in the DAB controller 100. A frequency delta represents a change in the period of the PWM signal between the primary and secondary sides 106,108.

Through this, both the switching frequency and phase shift control are utilized to deliver the constant power to the battery. In particular, phase shift between the primary and secondary bridges increases inversely with increase in the output battery voltage. Further, frequency control increases proportionally to the increase in operating battery output voltage.

In one embodiment, DAB converter 100, is a converter with a primary side 106 and a secondary side 108. The primary side 106 may include bi-directional switches S1-S4, operating at a 50% duty cycle. The secondary side 108 may include switches S5-S8, that are pulse width modulated. The pulse width modulation of switches S5-S8, may be controlled by control block 300, where phase and/or frequency control is added to place the power provided to the battery at a desired level. The phase and/or frequency control is determined based on the operation zone (e.g., Zone 1 202-Zone 3 206) the desired output voltage falls in. Further, modulation of switches S5-S8 can occur via frequency, pulse width, and/or phase shift modulation of the switches. Thus, switches S5-S8 can be controlled by an ON/OFF signal and time synchronization. Therefore, a phase shift provides a delay, relative to the primary side 106 switches S1-S4, before providing the ON signal to the secondary side switches S5-S8, while the frequency delta provides the period of the signal or the amount of time the secondary side switches S5-S8 are ON.

As an example, the DAB converter 100 can operate with a 50% duty cycle on the primary side 106 and PWM of the secondary side 108 and have an input alternating current voltage with a 10 μs period. Thus, the signal can have a 5 μs positive cycle and a 5 μs negative cycle. If it is determined that a 2 μs phase shift is needed for powering the load to the desired output power, then the switches on the secondary side 108 turn ON 2 μs later with respect to the start time of the switches on the primary side 106. The phase shift provided accounts for the voltage required to maintain the constant power to the load at the desired output voltage level.

Note that in control block 300, control of the DAB converter 100 may occur at a processor. Thus, detection of the voltage at the battery, the desired voltage of operation, and the AC side voltage, may be determined by a processor (not shown). The parameter generation block may receive the values and provide them to the control loops 320,304 and modulator 306. Modulator 306 may use the parameters in conjunction with the phase shift delay and/or frequency delay to control the switches. Additionally, modulator 306 can perform time synchronization as may be necessary by the system (e.g., frequency modulation).

In operating in Zone 3 206 (or high operating battery voltage), the power provided to the battery is reduced proportionally to an increase in the operating voltage of the battery, dropping to zero charging power. In this zone, switching frequency is held constant and only phase shift control is utilized to deliver the required power in a similar manner as described above.

Figure 4:
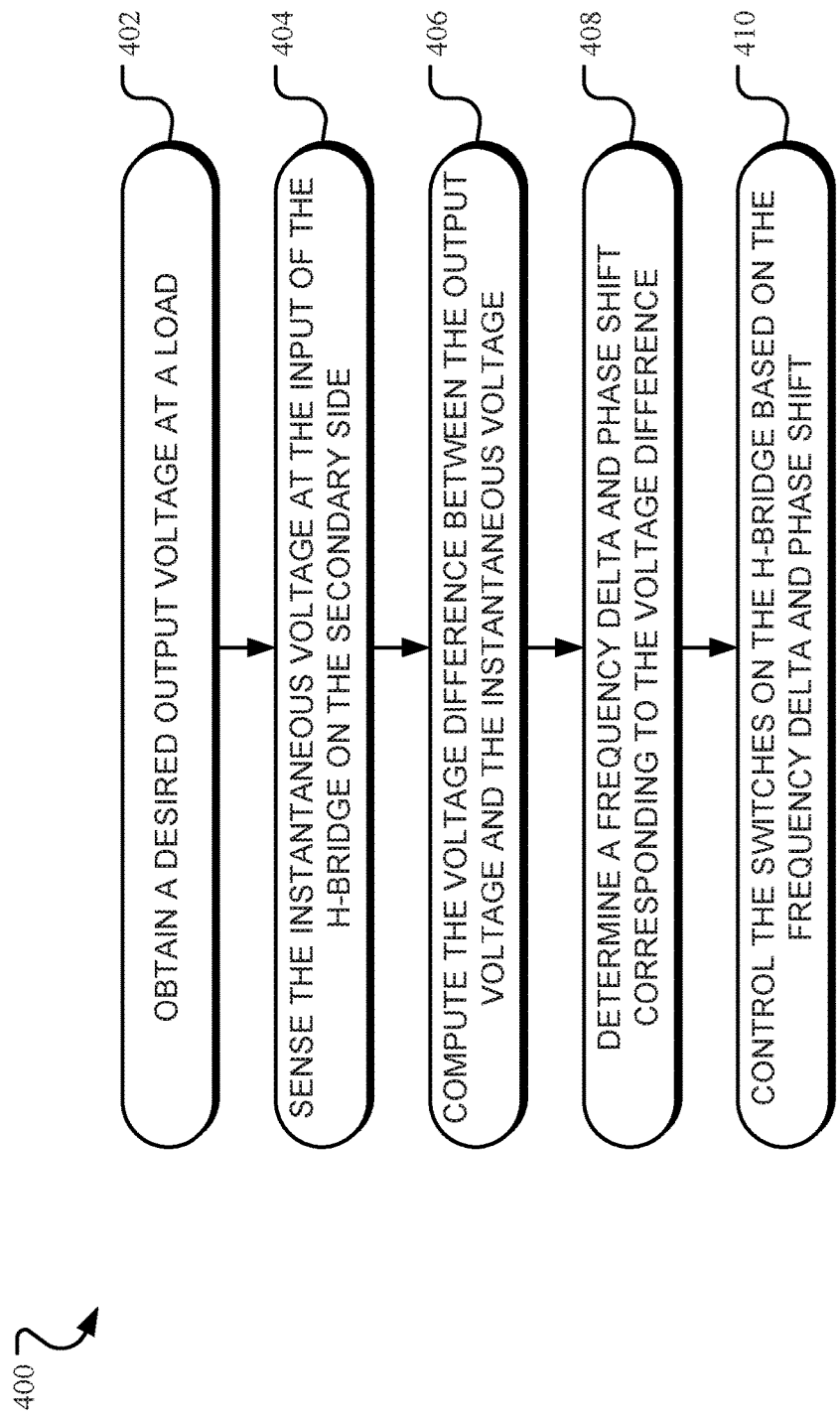
FIG. 4 is a flowchart of a method for providing phase shift and frequency control to a single-stage, dual-active bridge converter.

FIG. 4 is a flowchart of a method for single-phase charging using phase shift and frequency control. As illustrated in FIG. 3, a control block 300 is introduced for use in phase shift and frequency control for the charging of a battery utilizing the single-stage dual active bridge converter 100. FIG. 4 corresponds to the flowchart used for providing the desired output power at the battery using the phase shift and frequency control of control block 300.

In this process, method 400 begins with operation 402 where a processor or other module obtains the operating voltage at the load, such as a battery. The voltage can be a predetermined value known by the processor or can be read by the processor or other module from the load. The output voltage can then be used to determine the corresponding control zone 202-206 in order to identify the corresponding control mechanism (e.g., frequency control and phase shift control) to use.

After the output voltage is known, method 400 continues to operation 404 where the instantaneous voltage at the input of the secondary side (e.g., the input of the H-bridge on the secondary side) is sensed. Sensing of the instantaneous voltage can occur by a processor or other module as well. The instantaneous voltage is read in order to determine the delta or difference between the desired output voltage at the load/battery and the voltage arriving at the switches S5-S8. Note that in some instances, the instantaneous voltage at the input of the secondary side H-bridge and output voltage can be determined simultaneously.

In operation 406, the voltage difference between the output voltage and instantaneous voltage is computed. The difference is used to determine the corresponding frequency delta and/or phase shift that provides the desired output voltage. Determining the voltage difference between the output voltage and the instantaneous voltage can occur at both or one of the control loops 302, 304 in FIG. 3.

Operation 408 includes determining the frequency delta and phase shift corresponding to the calculated voltage difference determined in operation 406. A phase shift controller may be used to determine the frequency delta and phase shift. A phase shift controller is generally a feedback regulator that helps eliminate the error between a baseline voltage (e.g., output voltage) and the current voltage in the system (instantaneous voltage). In some instances, a saturation loop and/or an anti-wind up gain may be used if the frequency delta and/or phase shift determined exceed the modulation bounds of the system. Additionally, a voltage-controlled oscillator (VCO) can be used in the frequency control loop 304 to enable the conversion from a delta voltage to a frequency voltage.

In operation 410, control of the switches on the secondary H bride in the single stage dual active bridge converter 100 occurs. As indicated above, the modulator has a direct connection to the switches on the bridges, thus is able to control the switching in order to achieve the desired output voltage.

Some advantages may be achieved through the use of the DAB converter 100. For example, the single-stage converter 100 may operate in a soft-switching state, such as zero-voltage switching (ZVS) zero-current switching (ZCS), etc. Unlike multi-stage converters in which only the DC-DC stage is soft-switched, the PFC stage of the disclosed DAB converter 100 may be hard-switched, meaning that it has significant switching losses. The single-stage converter control described above ensures that the circuit maintains either ZVS or ZCS so that the switching losses are near-zero, resulting in a high efficiency for the circuit operation. Also having zero or near zero switching losses gives it the flexibility to be pushed higher in switching frequencies to bring down the size of the magnetics, thereby increasing the net power density of the charger.

In addition, the circuit topology described herein provides bi-directional functionality, enabling power flow in both forward and reverse directions. In a grid to vehicle direction of operation, power is drawn from the grid to charge the electric vehicle. In a vehicle to grid direction of operation, power may be fed to the grid from the vehicle battery. In this scenario, the vehicle is treated as a storehouse of energy and feeds excess energy back to the grid. The bi-directional power flow is enabled by the use of switches in both primary and secondary H bridges which allow current conduction in both directions. In the scenario of reverse power flow, the converter essentially serves as an inverter, converting DC voltage from the battery to AC voltage synchronized at the grid line frequency. Phase shift and delta is the control variable used to transfer power from the source to the load in the forward power flow condition. By adjusting the phase shift from positive to negative, reverse power flow can be achieved. Also, similar to grid inverter control strategies, a phase lock loop can be used to synchronize the fundamental frequency of the converter to the grid frequency.

Figure 5:
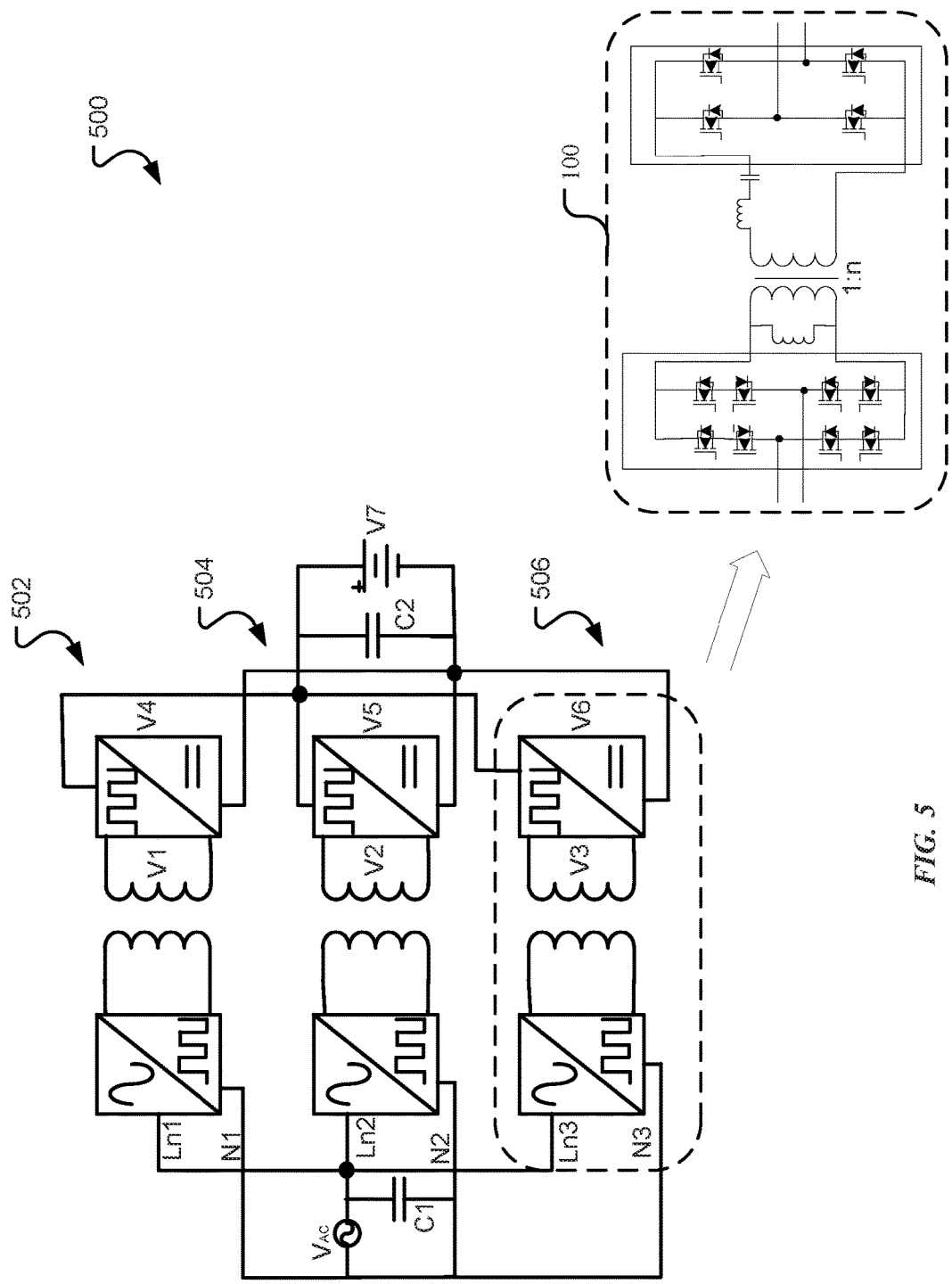
FIG. 5 is a diagram illustrating a phase modular single-stage, dual-active bridge converter for single-phase operation.

In some instances, it may be difficult to achieve the high voltage charging required by some high voltage devices operational at 800V and/or 1200 V using a single-stage dual active bridge converter system like DAB converter 100. Therefore, modular system 500 in FIG. 5 is introduced where DAB converter 100 of FIG. 1 is duplicated to form a modular phase topology that enables conversion to higher power by providing higher currents. By having three modules in a phase modular approach, the circuit 500 of FIG. 5 enables higher power levels by summing up the individual output currents from each module. Specifically, FIG. 5 is a diagram illustrating a phase modular single-stage dual-active bridge converter 500 for single-phase operation.

In the single-phase topology of modular system 500, three modular converters 502-506 (e.g., DAB converter 100) are duplicated and interconnected in parallel to provide a total high voltage desirable for high voltage charging of a load (e.g., battery V7 in a high voltage device) and may be stored in capacitor C2. In modular system 500, the interconnection between the three modular converters 502-506 for single-phase operation includes combining these modular converters 502-506. In general, the modular converters 202-206 are connected in parallel and operate 120° out of phase between the three modules. Therefore, a single input voltage Vac can be used to supply all three of the modular converters 502-506 via voltage lines Ln1-Ln3 and neutrals N1-N3, respectively. Each of the modular converters 502-506 can be provided to operate phase shifted by 0°, 120°, and 240°. In other words, pulses of the second module are phase-shifted by 120 degrees compared to the first module. This injects an instantaneous input current which has its switched currents 120 degrees phase-shifted to each other and hence they cancel out effectively.

Each modular converter 502-506 will operate independently as indicated in FIG. 1 with 50% duty ratios on the primary side H-bridges and controlled PWM switching on the secondary side H-bridges. Therefore, each modular converter 502-506 can independently determine an instantaneous voltage V1-V3 and desired output voltage V4-V6 respectively, to obtain the respective phase shift and frequency controls needed to achieve the desired output voltage V4-V6 for a total summed voltage V7.

In addition, since the modular converters 502-506 are operating with a 120° phase shift through the control pulses of the three modules, the ripple current introduced and present through the modular system 500 is cancelled out. Therefore, a reduced filter size is used and an improved efficiency is achieved.

Figure 6:
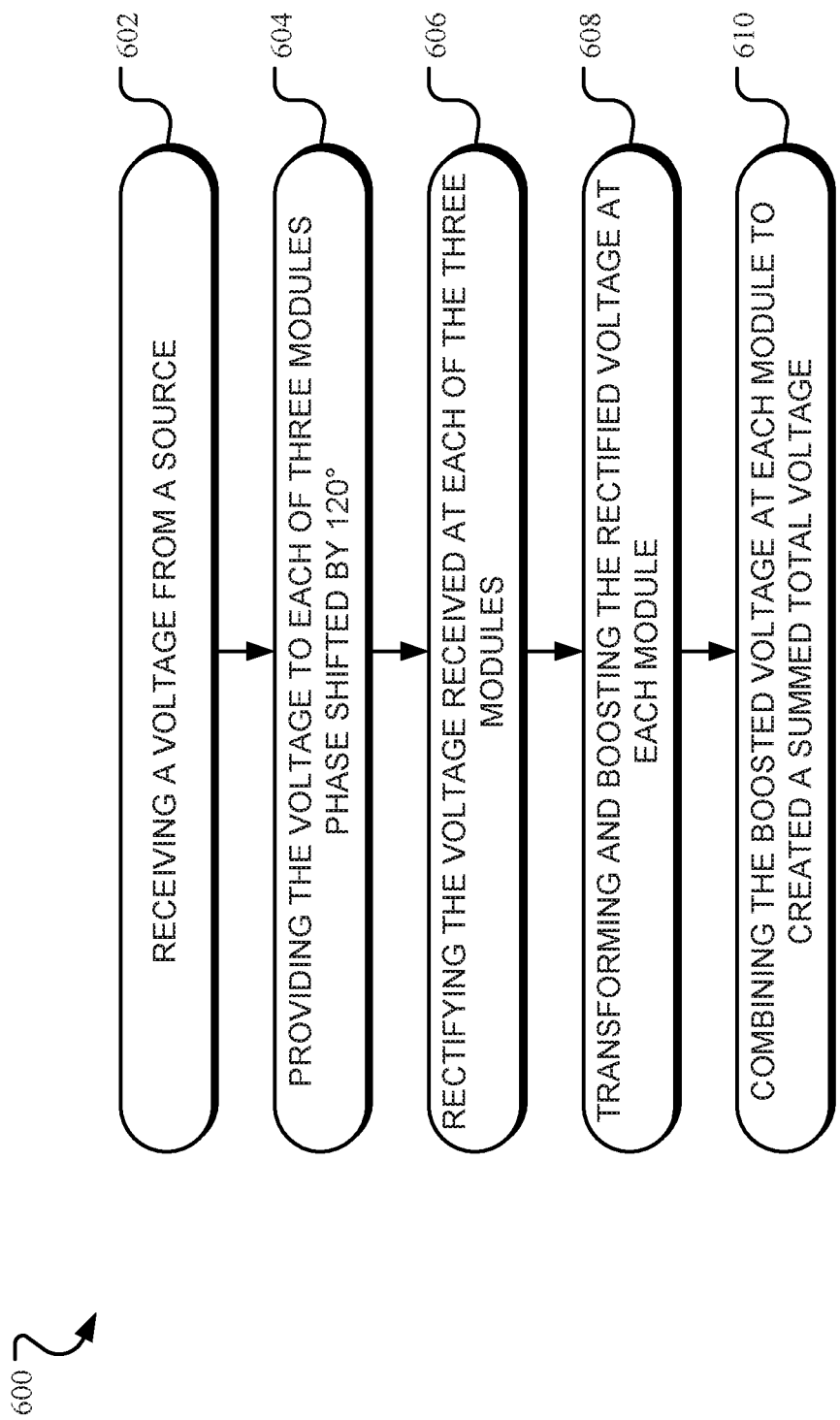
FIG. 6 is a flowchart of a method for single-phase charging using a phase modular single-stage, dual-active bridge converter.

FIG. 6 is a flowchart of a method for single-phase charging using a phase modular single-stage dual-active bridge converter. As illustrated in FIG. 5, a modular system 500 is introduced for providing a high voltage to a load using a single phase operation. FIG. 6 corresponds to the flowchart used for providing the voltage using the architecture of FIG. 5 above. Method 600 can apply to any high voltage battery system that can benefit from battery charging. In addition, although a single-stage dual active bridge converter system is used herein for charging, a multi-stage, boost, buck, buck-boost, or other converter may be used.

In this process, method 600 begins with operation 602 where an alternating current voltage supplies a voltage to the input of the modular system 500 for conversion. The modular system 500 can be a single stage system with modular converters 502-506 replicated to provide a total summed high voltage for charging.

After the voltage is supplied to the input of the modular system 500, method 600 continues to operation 604, where the single voltage supplied by the Vac source is provided to each of the modular converters 502-506 phase shifted by 120°. Each of the modular converters 502-506 processes the alternating current voltage supplied through the primary side of H-bridge. In the H-bridge, the voltage supplied is rectified and converted to a pulsating DC voltage providing AC-to-DC conversion and inherent PFC. In one embodiment, the switches S1-S4 on each of the converters on the primary side can operate on a 50% duty cycle.

Once the voltage has been converted to a pulsating DC voltage (e.g., in quasi-square wave form), method 600 continues to operation 608 where the voltage is transformed and boosted at each of the modular converters 502-506. Operation 608 occurs at the secondary side of each of the modular converters 502-506. First, the pulsating DC voltage arrives at the transformer that is designed with a 1:n turns ratio and takes the DC voltage (e.g., V1) from the primary side and transforms it into to an increased DC voltage (e.g., nV1). Then, the increased voltage pulse continues to the H-bridge switches S5-S8 which controlled to operate based on a desired voltage using pulse width modulation. As an instantaneous voltage on the secondary side 108 is determined and compared to a desired voltage, the switches S5-S8 are turn on and off accordingly to achieve the desired voltage level. As indicated above, control scheme 200 and block diagram 300 in conjunction with FIGS. 2-3 can be used to determine the appropriate phase shift and frequency to apply to the switches S5-S8 to achieve the desired voltage level. In modular system 500, since converter modules 502-506 run in parallel, the voltage and/or current control is applied at each of the secondary sides 108 so as to achieve a maximum total voltage desired for charging battery V7 (or any high powered system).

Once the voltage has been controlled to the desired level at each of the converter modules 502-506, method 600 proceeds to operation 610 where the voltages V4-V6 at the output of each modular converter 502-506 are summed to provide a total voltage that may be used for charging battery V7 and/or alternatively stored in capacitor C2.

Figure 7:
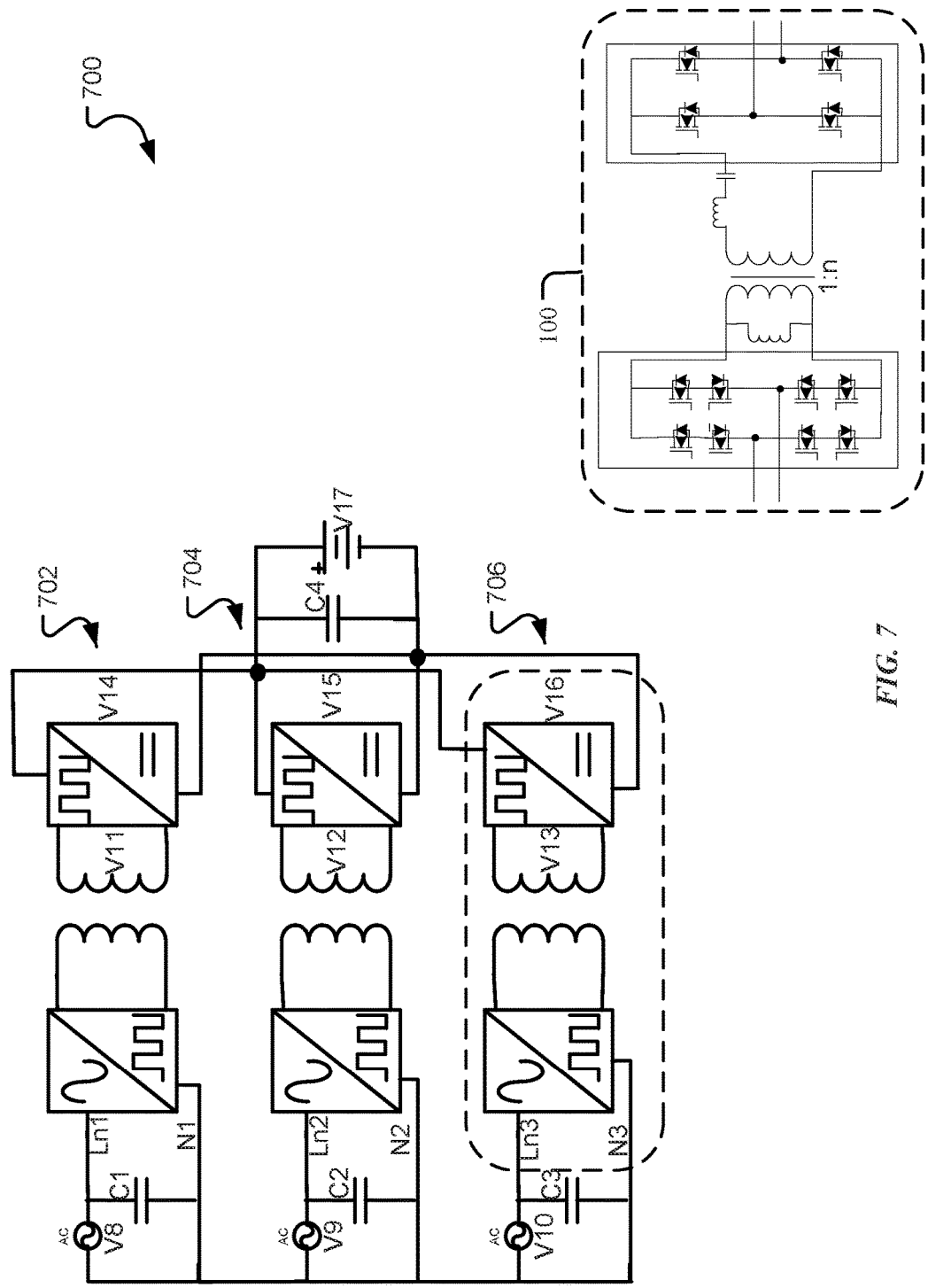
FIG. 7 is a diagram illustrating a phase modular single-stage, dual-active bridge converter for three-phase operation.

In some instances, three phase operation is needed for charging the high voltage system. In these instances, it is advantageous to have a single system that may be interchangeably used for either one phase or three phase operation. FIG. 7 introduces three phase modular system 700 (previously, modular system 500) which was used for one phase operation now interconnected for three phase operation. Specifically, FIG. 7 is a diagram illustrating a phase modular single-stage dual-active bridge converter for three-phase operation.

As illustrated in FIG. 7, the three phase modular system 700 continues the use of modular converter 100 which has been replicated three times (e.g., converters 702-706) and interconnected to provide a total summed voltage V17 that may be stored in capacitor C4 and used for a charging battery. Each converter 702-706 comprises a primary side 106 50% duty cycled PFC rectifying H-bridge and secondary side 108 pulse width modulated H-bridge.

The modular converter 100, having the same topology as the single phase modular system 500 of FIG. 5, also includes converters 702-706 that have corresponding voltage lines Ln1-Ln3 and neutral lines N1-N3 as inputs. Like the modular system 500 in single phase operation, three phase modular system 700 will also operate by use a single neutral line that is share by all three converters 7020706 via neutral line inputs N1-N3. However, specific to the three phase operation is the use of three independent voltage sources V1-V3 arriving at each of the converters 703-706 respectively. Therefore, unlike the single phase system 500 where a single voltage source is used for all three converters, in the three phase modular system 700, three voltage sources V8-V10 are used. Thus, each of the converters 702-706 will have voltage line Ln1-Ln3 that feeds the corresponding converter. Because three independent voltage sources are used in the three phase modular system 700 topology, each of the voltage source V8-V10 can provide a distinct alternating current voltage. However, generally in a three phase system equivalent alternating current voltages are provided that are phase shifted by 120° degrees. Therefore, in the three phase module system 700, voltage sources V8-V10 each provide an alternating current voltage, where the alternating current voltage at each voltage source V8-V10 has an equivalent amplitude with a 120° offset. Since three independent sources V8-V10 are used in the three phase modular system 700, interleaving of the converters 702-706 is not necessary.

Also, as three independent voltage sources V8-V10 are providing voltage to each of the converters 702-706, the converters 702-706 can function independently. That is to say, the PFC rectification and conversion that occurs on the primary side and secondary side of each converter 702-706 can operate without interdependence on the other converters. For example, converter 702, can obtain an alternating current voltage from source V8. The alternating current voltage can then be rectified to a pulsating DC independent of the rectification occurring in converter 704 which is using the alternating current voltage from source V9. Similarly, the frequency and phase shift control may be applied to converter 702 independent of the phase shift and frequency control of converter 704. Therefore, each of the modular converters 702-706 can independently determine an instantaneous voltage V11-V13 and desired output voltage V14-V16 respectively, to obtain the respective phase shift and frequency controls needed to achieve the desired output voltage V14-V16 for a total summed voltage V17. Therefore, the converters 702-704 can work independently of each other to achieve a total summed voltage V17.

Figure 8:
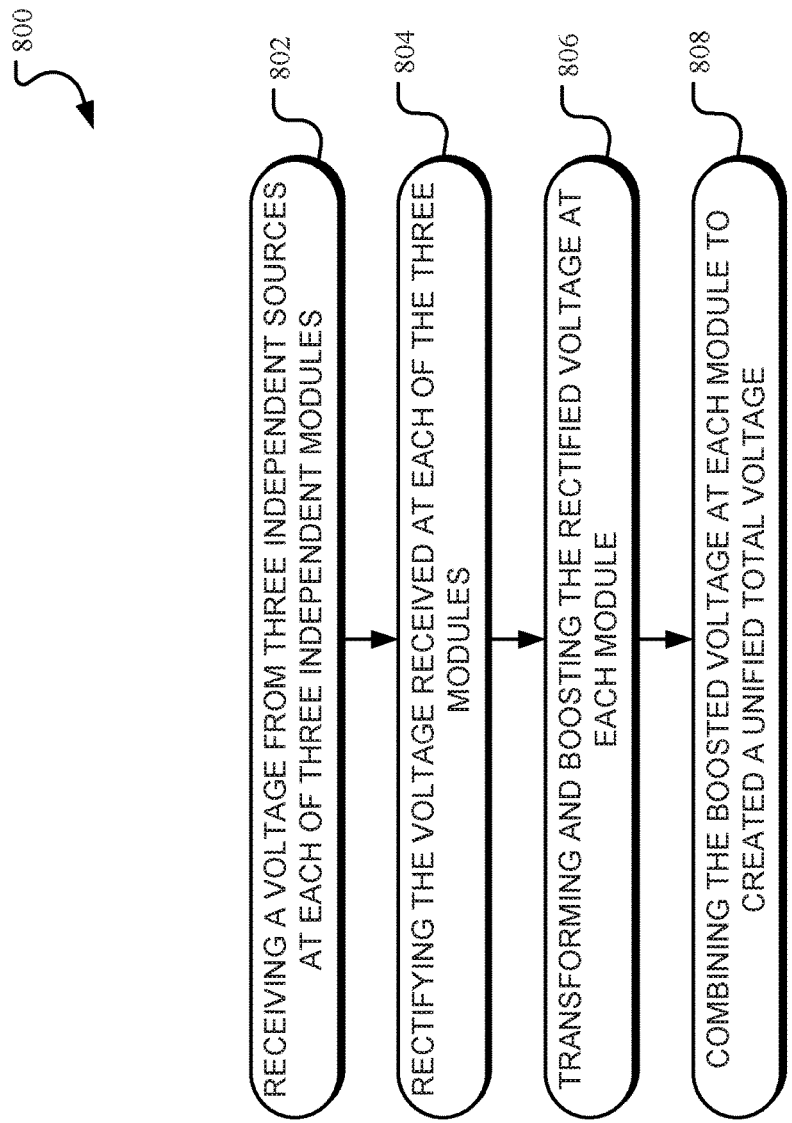
FIG. 8 is a flowchart of a method for three-phase charging using a phase modular single-stage, dual-active bridge converter.

FIG. 8 is a flowchart of a method for three-phase charging using a phase modular single-stage dual-active bridge converter. As illustrated in FIG. 7, a three phase modular system 400 was introduced for providing a high voltage to a load using a three phase operation. FIG. 8 corresponds to the flowchart used for providing the voltage using the architecture of FIG. 7 above. Method 800 can apply to any high voltage battery system that can benefit from battery charging. In addition, although a single-stage dual active bridge converter system is used herein for charging, a multi-stage, boost, buck, buck-boost, or other converter may be used.

In this process, method 800 begins with operation 802 where three distinct alternating current voltage supplies, supply a voltage to the input of the three-phase modular system 700 for conversion. The three phase modular system 700 can be a single stage system with three modular converters 702-706, each receiving an alternating current voltage one of the three alternating voltage supplies V8-V10. In one embodiment, the AC voltage received at each converter is equivalent with a phase shift of 120° degrees.

In operation 804, the voltage supplied at each of the converter is processed through the primary side 106 of H-bridge where the alternating current voltage V8 is rectified and converted to a pulsating DC voltage providing AC-to-DC conversion and inherent PFC. In one embodiment, the switches S1-S4 on each of the converters 702-706 on the primary side can operate on a 50% duty cycle.

In operation 806, the pulsing AC voltage is processed through the secondary side 108 where the voltage gets transformed and boosted at each of the converters 702-706. First, the pulsating AC voltage arrives at the transformer that is designed with a 1:n turns ratio and takes the AC voltage (e.g., V8) from the primary side 106 and transforms it into to an increased AC voltage (e.g., nV8). Then, the boosted voltage pulse continues to the H-bridge switches S5-S8 which are voltage controlled using pulse width modulation. Therefore, the instantaneous voltage on the secondary side 108 relative to a desired voltage determines the switching of switches S5-S8 to achieve the desired voltage level. Phase shift and frequency control can be used to determine the appropriate phase shift and frequency to apply to the switches S5-S8 to achieve the desired voltage level. In three phase modular system 700, since converter modules 702-706 run in parallel, the phase shift and/or frequency control is applied at each of the secondary sides 108 so as to achieve a maximum total voltage desired for charging battery V17 (or any high powered system).

Once the voltage has been controlled to achieve the desired level at each of the converter modules 702-706, operation 808 proceeds to provide a combined boosted voltage by summing the voltages V14-V16 at the output of each converter 702-706.

Note that the various recovery modes presented are for illustration purposes and can occur in any order. Additionally, the voltage and current ranges are also used as an illustration and can vary in range width and values. Further, the voltage flows and charge current flows in the timing diagram may also vary as the operations transition between modes.

Figure 9:
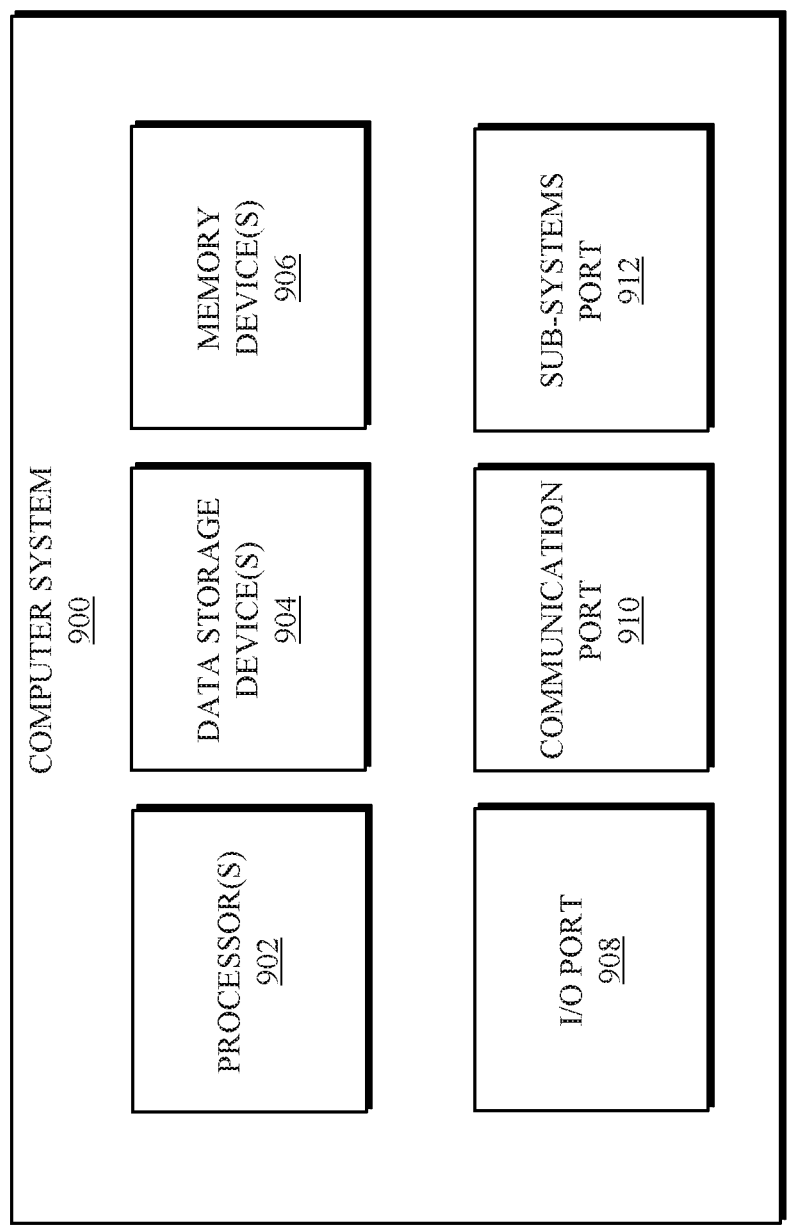
FIG. 9 is a diagram illustrating an example of a computing system which may be used in implementing embodiments of the present disclosure.

Referring now to FIG. 9, a detailed description of an example computing system 900 having one or more computing units that may implement various systems and methods discussed herein is provided, such as the modulator 306 of the circuit 300 of FIG. 3. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 906, and/or one or more ports 908-912. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-912, thereby transforming the computer system 900 in FIG. 9 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna for electromagnetic signal transmission and/or reception. In some examples, an antenna may be employed to receive Global Positioning System (GPS) data to facilitate determination of a location of a machine, vehicle, or another device.

The computer system 900 may include a sub-systems port 912 for communicating with one or more systems related to a vehicle to control an operation of the vehicle and/or exchange information between the computer system 900 and one or more sub-systems of the vehicle. Examples of such sub-systems of a vehicle, include, without limitation, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of the mobile device) executing the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for charging a battery comprising:
    obtaining an output voltage of a battery, wherein the obtained output voltage is within one of a plurality of predetermined voltage zones, the predetermined voltage zones defined by a first threshold level and a second threshold level;
    sensing an instantaneous voltage at an input of a first H-bridge circuit of a single stage charger circuit;
    calculating a frequency shift value and a phase shift value from the voltage difference voltage of the output voltage and the sensed instantaneous voltage;
    transmitting the frequency shift value and the phase shift value to a modulator, the modulator generating a frequency control signal based on the frequency shift value and a phase shift control signal based on the phase shift value, the frequency control signal and the phase shift control signal corresponding to the one of the plurality of predetermined voltage zones of the obtained output voltage; and
    controlling, utilizing the modulator, a plurality of switches in the first H-bridge based on the frequency control signal and the phase shift control signal to provide a charging output power to the battery.

2. The method of claim 1, wherein the frequency shift value transmitted to the modulator is an output of a frequency control loop circuit.

3. The method of claim 2, wherein the phase shift value transmitted to the modulator is an output of a phase shift control loop circuit.

4. The method of claim 1, wherein a first voltage zone of the plurality of predetermined voltage zones comprises obtained output voltages below the first threshold level and wherein the frequency control signal provides a constant frequency control to the first H-bridge circuit and the phase shift control signal provides the phase shift value to the first H-bridge circuit.

5. The method of claim 4 wherein the controlling the plurality of switches in the first H-bridge when the output voltage of the battery is within the first voltage zone provides a constant desired output power of the single stage charger circuit to the battery.

6. The method of claim 1, wherein a second voltage zone of the plurality of predetermined voltage zones comprises obtained output voltages between the first threshold level and the second threshold level and controlling the plurality of switches in the first H-bridge circuit comprises providing a linearly increasing frequency control that applies the frequency shift value to the first H-bridge circuit.

7. The method of claim 6 wherein the controlling the plurality of switches in the first H-bridge when the output voltage of the battery is within the second voltage zone provides a constant desired output power of the single stage charger circuit to the battery.

8. The method of claim 1, wherein a third voltage zone of the plurality of predetermined voltage zones comprises obtained output voltages above the second threshold level and wherein the frequency control signal provides a constant frequency control to the first H-bridge circuit at a first minimum operating frequency and the phase shift control signal provides a linearly declining phase shift control that applies the phase shift value to the first H-bridge circuit.

9. The method of claim 3, wherein an output of the phase shift control loop circuit and an output of the frequency control loop circuit are transmitted to the modulator to control the switches of the first H-bridge circuit.

10. The method of claim 3, wherein the frequency control loop circuit further comprises a carrier generator module.

11. The method of claim 3, wherein the frequency shift value and the phase shift value are controlled on the first H-bridge circuit relative to a second H-bridge circuit.

12. A single stage battery charger circuit comprising:
    a power factor correction (PFC) converter comprising a first H-bridge circuit comprising a plurality of switches;
    a transformer circuit in electrical communication with the PFC converter;
    a converter circuit in electrical communication with the transformer circuit, the converter circuit comprising a second H-bridge circuit; and
    a control circuit configured to:
        obtain an output voltage of a battery, wherein the obtained output voltage is within one of a plurality of predetermined voltage zones, the predetermined voltage zones defined by a first threshold level and a second threshold level;
        calculate a frequency shift value and a phase shift value from the voltage difference voltage of the output voltage and a sensed instantaneous voltage at an input of a first H-bridge circuit of a single stage charger circuit;
        calculate a frequency shift value and a phase shift value from the voltage difference voltage of the output voltage and the sensed instantaneous voltage at an input of the first H-bridge circuit of the PFC converter, wherein the frequency shift value and the phase shift value are based at least on the one of the plurality of predetermined voltage zones corresponding to the obtained output voltage;
        transmit the frequency shift value and the phase shift value to a modulator, the modulator generating a frequency control signal based on the frequency shift value and a phase shift control signal based on the phase shift value, the frequency control signal and the phase shift control signal corresponding to the one of the plurality of predetermined voltage zones of the obtained output voltage; and
        control, utilizing the modulator, a plurality of switches in the first H-bridge based on the frequency control signal and the phase shift control signal to provide a charging output power to the battery.

13. The circuit of claim 12, wherein the control circuit comprises a frequency control loop circuit providing a frequency control for the first H-bridge circuit and a phase shift control loop circuit providing a phase shift control for the first H-bridge circuit.

14. The circuit of claim 13, wherein a first voltage zone of the plurality of predetermined voltage zones comprises obtained output voltages below the first threshold level and controlling a plurality of switches in the first H-bridge circuit comprises providing a constant frequency control at a first minimum operating frequency and a phase shift control that applies the frequency shift value to the first H-bridge circuit.

15. The circuit of claim 14 wherein the controlling the plurality of switches in the first H-bridge when the output voltage of the battery is within the first voltage zone provides a constant desired output power of the single stage charger circuit to the battery.

16. The circuit of claim 13, wherein a second voltage zone of the plurality of predetermined voltage zones comprises obtained output voltages between the first threshold level and the second threshold level and controlling a plurality of switches in the first H-bridge circuit comprises a linearly increasing frequency control that applies the frequency shift value to the first H-bridge circuit.

17. The circuit of claim 16 wherein the controlling the plurality of switches in the first H-bridge when the output voltage of the battery is within the second voltage zone provides a constant desired output power of the single stage charger circuit to the battery.

18. The circuit of claim 13, wherein a third voltage zone of the plurality of predetermined voltage zones comprises obtained output voltages above the second threshold level and controlling the plurality of switches in the first H-bridge circuit comprises a constant frequency control at a first minimum operating frequency that applies the frequency shift value to the first H-bridge circuit and a linearly declining phase shift control that applies the phase shift value to the first H-bridge circuit.

19. The circuit of claim 12 wherein the modulator receives an output of the phase shift control loop circuit and an output of the frequency control loop circuit to control the switches of the first H-bridge circuit.

20. An apparatus comprising:
a first single stage charger including a first power factor correction (PFC) converter, a first converter, and a first transformer coupling the first PFC converter and the first converter to provide a first rectified power factor correction while increasing a first voltage supplied to the first single stage charger at a first voltage line electrically connected to a first neutral line, wherein a first frequency delta and a first phase shift is applied at the first converter;
a second single stage charger including, a second power factor correction (PFC) converter, a second converter, and a second transformer coupling the second PFC converter and the second converter to provide a second rectified power factor correction while increasing a second voltage supplied to the second single stage charger at a second voltage line electrically connected to a second neutral line, wherein a second frequency delta and a second phase shift is applied at the first converter;
a third single stage charger including a third power factor correction (PFC) converter, a third converter, and a third transformer coupling the third PFC converter and the third converter to provide a third rectified power factor correction while increasing a third voltage supplied to the third single stage charger at a third voltage line electrically connected to a third neutral line wherein a third frequency delta and a third phase shift is applied at the first converter;
a first phase distribution type wherein the first, the second, and the third single stage chargers are electrically connected, and wherein the second and the third voltage lines are dependent on the first voltage line and the second and third neutral lines dependent on the first neutral line;
a second phase distribution type wherein the first, the second, and the third voltage lines are independent, and wherein the second and third neutral lines are dependent on the first neutral line; and
wherein the first, the second, and the third single stage chargers are electrically interconnected to each other at an output.

* * * * *